Jan. 12, 1954  A. A. JOHNSON  2,665,451
APPARATUS AND METHOD FOR MANUFACTURE OF COMPOSITE ARTICLES
Filed June 17, 1948  2 Sheets-Sheet 1

INVENTOR.
Arthur A. Johnson
BY
Johnson and Kline
ATTORNEYS

Jan. 12, 1954　　　A. A. JOHNSON　　　2,665,451
APPARATUS AND METHOD FOR MANUFACTURE OF COMPOSITE ARTICLES
Filed June 17, 1948　　　　　　　　　　　　　　2 Sheets-Sheet 2
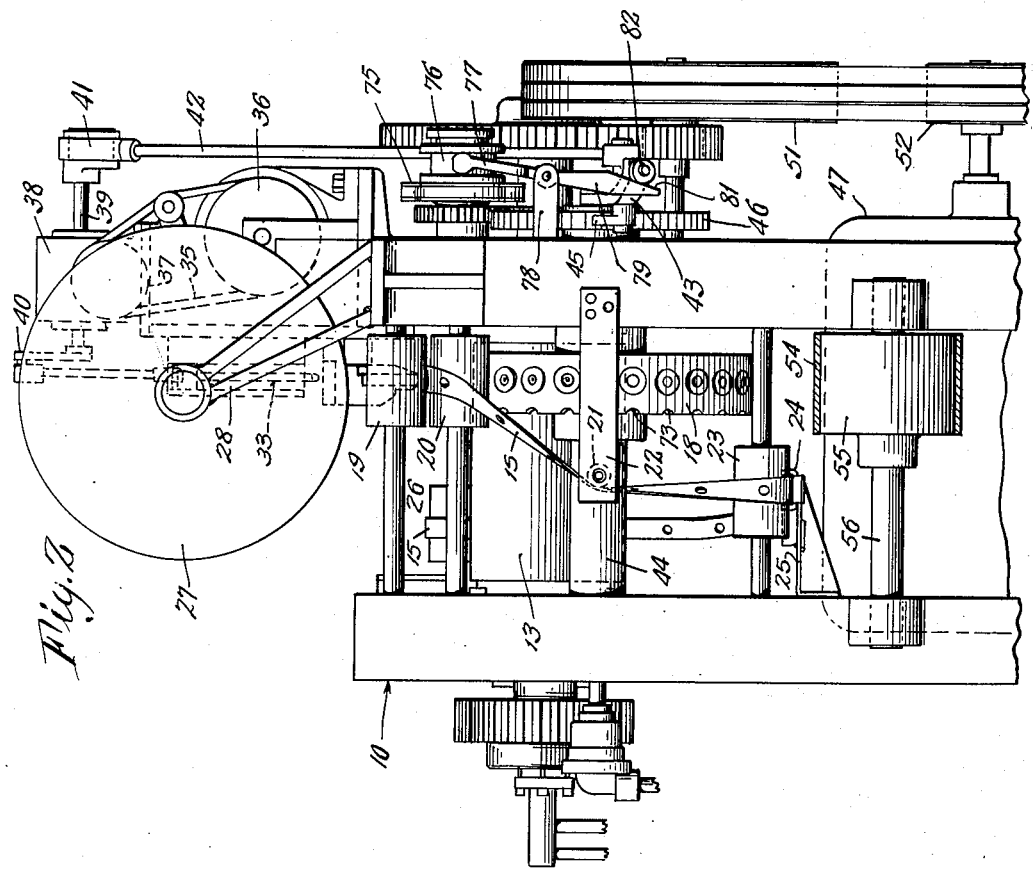
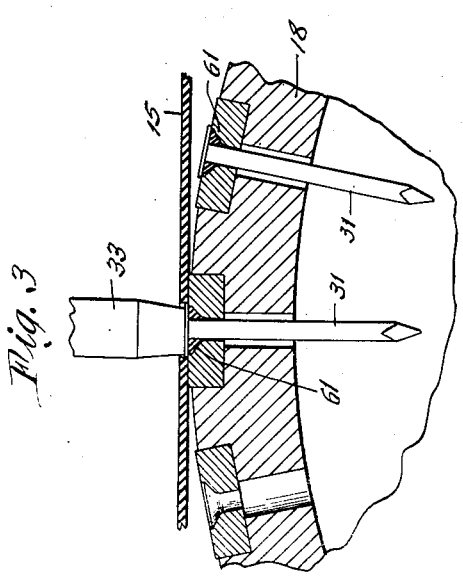
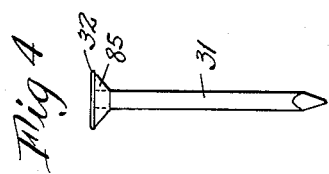
INVENTOR.
Arthur A. Johnson
BY
Johnson and Kline
ATTORNEYS Patented Jan. 12, 1954

2,665,451

UNITED STATES PATENT OFFICE 2,665,451

APPARATUS AND METHOD FOR MANUFACTURE OF COMPOSITE ARTICLES

Arthur A. Johnson, Bridgeport, Conn., assignor to The Gora-Lee Corporation, Stratford, Conn., a corporation of Connecticut Application June 17, 1948, Serial No. 33,591

18 Claims. (Cl. 18—21)

This invention relates to the manufacture of composite articles and particularly to the manufacture of articles having a part formed of a moldable or thermoplastic material and another part formed of a harder material, such for example as a metal.

Heretofore, in manufacturing composite articles of this type, the different parts have usually been made separately and the finished separate parts then assembled to make the complete composite product. When one part has been formed of a moldable material requiring curing or vulcanizing, as is the case with rubber and the like, such treatment has usually been carried out in the manufacture of the individual part prior to the assembling operation.

An object of the present invention is to provide an improved method and apparatus for forming composite articles by a continuous operation in which the moldable part is both molded and assembled with an associated part in a single operation.

A further object is to provide a method and apparatus for making composite articles having a part formed from a moldable material, requiring curing or vulcanizing in which such treatment of the part prior to assembly is eliminated.

A further object is to provide a method and apparatus for making articles of the above type in which the associated part is itself employed in blanking the moldable part from a stock of material and then molding it in place.

A still further object is to provide a method and apparatus for manufacturing composite articles in which double handling of the separate parts such as has heretofore generally been required, is eliminated.

For the purpose of the present disclosure, the invention is described and illustrated in connection with the manufacture of headed fasteners such, for example, as nails having underheads or washers formed thereon of a thermoplastic material, which may, for example, be any desired type of rubber, natural, synthetic, artificial, etc., although it will be apparent that any other thermoplastic material can be employed. When such material as rubber is employed, the invention includes the step of curing or vulcanizing the material in place by exposing the composite article to a curing temperature for the requisite length of time after assembly of the different parts. This eliminates separate handling of the different parts even when one requires a special treatment.

In the accompanying drawings—

Fig. 2 is an end elevation taken from the right of Fig. 1;

Fig. 3 is a section on an enlarged scale taken through the molding dies shown in Figs. 1 and 2; and Fig. 4 is an elevation of a finished composite nail as produced on the illustrated machine.

Figure 1:
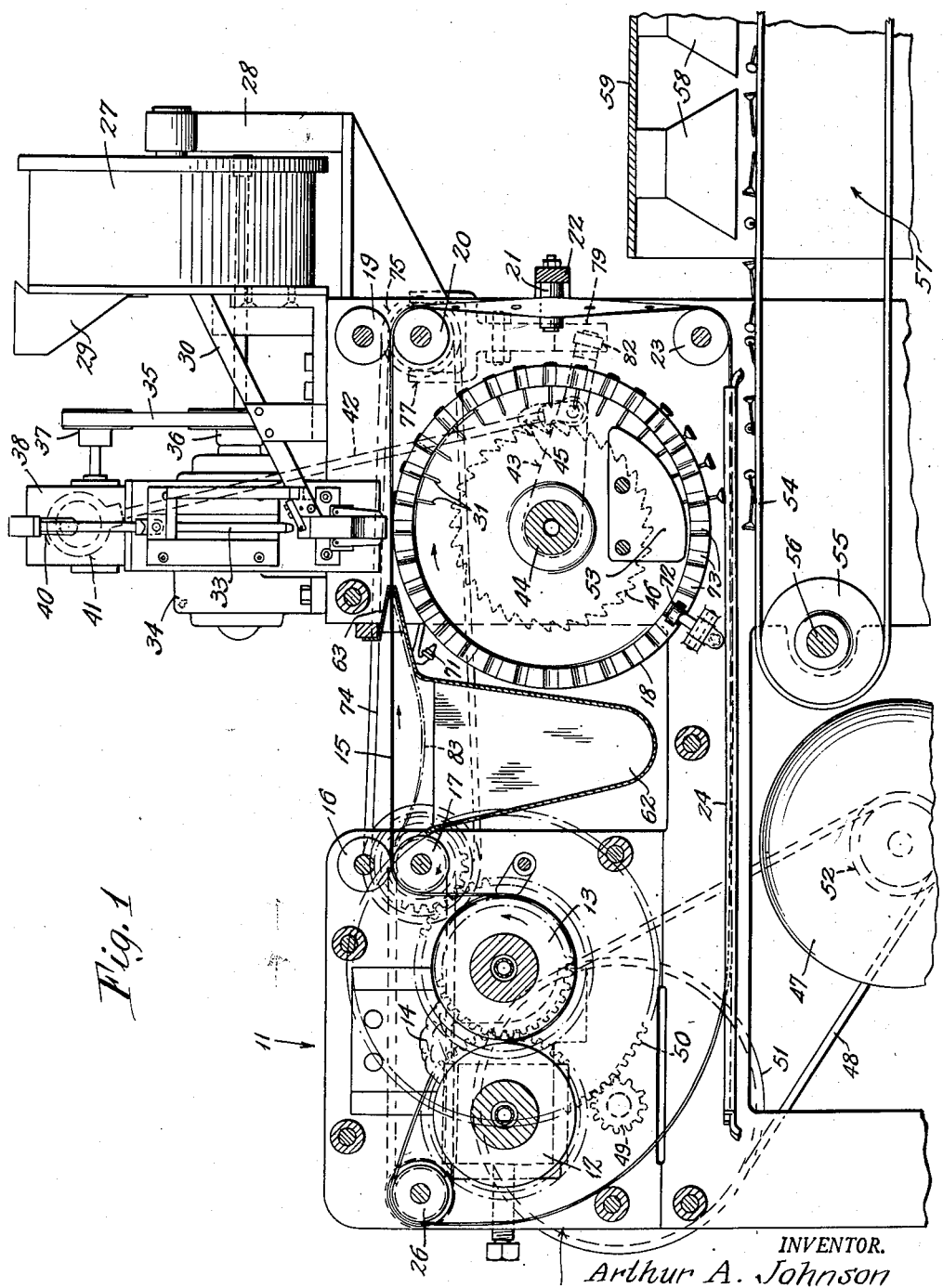
Figure 1 is a side elevation of a machine constructed in accordance with one embodiment of this invention and adapted to produce nails having underheads of a suitable elastomer in accordance with the present method.

The particular embodiment of the apparatus which has been chosen for the purpose of illustration, includes a mill for plasticizing the moldable material which is generally similar to that shown and described in Patent No. 2,548,306. The material is plasticized between rotating plasticizing rolls on one of which it builds up a layer of moldable material. From this layer a strip or band is cut and continuously fed to a molding drum having underhead or washer forming dies or molds around its periphery. The drum is intermittently rotated to place successive molding dies in position at a molding station under a reciprocating nail-driving plunger, and the strip of moldable material is intermittently fed through the molding station between the plunger and the dies on the drum. Mechanism is provided for successively feeding nails into position beneath the plunger above the moldable strip and the molding die. As a result, downward movement of the plunger drives the nail through the strip of plastic material into the adjacent mold cavity. In this operation the nail head operates as a blanking die to sever a blank of moldable material from the strip and force it into the mold cavity. In the mold cavity, the plastic blank is molded in place to form a nail underhead or washer. In this operation the nail head and shank form a part of the mold wall, and the plastic material is thereby simultaneously molded in place and assembled on the associated part of the finished article. Thereafter the composite article is ejected from the mold. When rubber or other material requiring curing or vulcanizing is employed as the plastic material, the assembled articles are delivered onto an endless belt or other mechanism for conveyance through a curing zone such as a vulcanizing oven.

Referring more particularly to the drawing, there is shown therein an apparatus having a frame 10, at one end of which is arranged a plasticizing mill, generally indicated at 11 and including a pair of rolls 12 and 13 geared to rotate in opposite directions and adapted to reduce a mass of plastic substance 14 to a layer on the roll 13 from which a web or strip 15 is cut and led through continuously rotated feed rollers 16 and 17, thence longitudinally of the frame 10 substantially tangentially across the top of a molding drum 18 where the underhead is blanked out of the strip and molded. From the molding drum the skeletonized strip is passed over intermittently driven feed rollers 19 and 20, thence downwardly and angularly over a guide roller 21 carried by a bracket 22 attached to the frame 10, thence over a guide roller 23 mounted transversely in the frame, thence rearwardly through a guide trough 24 carried by brackets 25 affixed to the frame 10, upwardly and over a driven roller 26 and back to the mill, where it is returned to and reincorporated in the mass of plastic material 14. In this way substantially all waste of plastic material is avoided.

A circular nail hopper 27 is carried by a bracket 28 at the top of the frame 10 and is provided with a filling nozzle 29 and a nail delivery chute 30. Nails 31 having heads 32 are delivered by the chute 30 to position beneath a plunger 33 which is vertically reciprocated by a motor 34 through a belt 35, pulleys 36 and 37, reduction gears (not shown) in a gear housing 38, a shaft 39 and a crank 40. Such mechanism is disclosed and claimed in Patent No. 2,613,374.

An eccentric 41 on the shaft 39 is connected by a rod 42 with an arm 43 pivotally mounted upon a transversely extending shaft 44 which also supports the drum 18. The arm 43 has a pawl 45 engaging a ratchet wheel 46 for intermittently rotating the shaft 44 and the molding drum.

A motor 47 is provided for operating the mill 11 through a belt 48, gears 49 and 50 and pulleys 51 and 52.

Interiorly of the drum 18 there is provided a relatively stationary cammed ejector plate 53 and an endless belt 54 extends from a pulley 55 mounted upon a transversely extending shaft 56 in the frame 10. This belt is positioned beneath the drum 18 and extends through a curing zone such, for example, as a vulcanizing oven 57 having a plurality of heat-producing lamps 58 extending downwardly from the hood 59 thereof to points directly over the belt 54.

A trough 62 is located between the feed rollers 16, 17 and the molding drum 18, and the upper edge of the trough adjacent the molding drum is shaped to form a guide nozzle 63 for directing the strip into position between the drum and the plunger 33. A nozzle 71 or the like, see Fig. 1, delivers a mold lubricant to the molding dies to prevent the plastic material from sticking thereto. A suitable detent mechanism, such as a yieldingly mounting roller 72, which successively engages detent recesses 73 in the edge of the molding drum, is provided for holding the drum stationary and properly locating and holding successive molds at the molding station under the plunger 33 during the molding operation.

The strip 15 of plastic material is intermittently fed beneath the plunger 33 in timed relation to the rotation of the molding drum. As illustrated, the mechanism for accomplishing this includes a driving belt 74 passing over a pulley on the shaft of the continuously driven feed roller 17, see Fig. 1, and a pulley 75 to which the shaft of the roller 20 is connected by a clutch mechanism including clutch collar 76 actuated by a clutch yoke 77 pivoted on a supporting bracket 78 and having a downwardly extending clutch-operating arm 79 terminating in a cam face 81 operatively engaged by a clutch actuating roller 82 on the adjacent end of the drum operating pawl lever 43. Obviously, upward movement of the pawl lever 43, which occurs during downwardly movement of the nail driving plunger 33, oscillates the clutch arm 79 to shift the clutch collar and release the driving clutch for the roller 20, thus temporarily interrupting the feed of the plastic strip 15 during the blanking and molding operations. An ordinary clutch spring (not shown) causes the clutch to engage upon downward movement of the pawl arm 43 so as to rotate the feed roller 20 and bring a fresh part of the strip 15 into the molding station over the next succeeding molding die.

During the blanking and molding operation, when the roller 20 is declutched, continued rotation of the feed rollers 16 and 17 forms a loop 83 in the strip 15 above the trough 62. At this time, the guiding nozzle 63 serves to support the strip on that side of the drum.

The rate of feed of the strip 15 as determined by the operation of the plasticizing rollers and the feed rollers 16 and 17 is so proportioned that the aggregate advancement of the strips by intermittent movements as controlled by the rollers 19 and 20 does not cause the loop 83 to accumulate excessively. The loop 83 merely provides sufficient material so that it can be taken up quickly by the movement of the rollers 19 and 20 between operations of driving the nail into the stock and molding the underhead thereon. During the descent of the plunger 33 when the roller 20 is declutched, the molding drum is held stationary by the detent 72. Under these conditions, the plunger 33 drives the nail downwardly through the strip 15 and associated molding die 61, causing the nail head to blank out a part of the strip 15 and force it beneath the head into the molding die where it is molded between the nail head and shank and the wall of the mold cavity, and simultaneously applied to the nail to form an underhead 85 thereon.

As the drum 18 continues to rotate, the composite articles are ejected from the lower portion thereof by the ejector plate 53. When the underhead is formed of a material requiring curing, such as vulcanizing in the case of rubber or a rubber-like material, the articles are preferably ejected on an endless belt on which they are carried through a curing zone such as the vulcanizing oven illustrated, the speed of the belt being so regulated as to subject the articles to the necessary curing temperature for the requisite period of time.

The operation of the machine is automatic and will continue substantially without attention as long as raw material is supplied to the mill rolls and the necessary fastening elements supplied to the hopper 27.

By this invention, nails are provided with plastic underheads and the material of the underheads vulcanized or otherwise cured, when necessary, without requiring any separate handling of the different parts. The underhead is blanked out of stock material, molded and vulcanized in place on the nail body, thus eliminating any separate treatment thereof and obtaining a far more permanent union of the nail and underhead than has heretofore been possible.

It will be apparent that the invention can be variously modified and adapted, and that parts of the improvements can be employed without others.

I claim:

1. The method of making a composite article having one part formed from a moldable material and another part formed from a rigid material, comprising forcing the rigid part of said article through a strip of moldable stock material both to blank said moldable part from said strip of stock, and then to press said blanked part in a mold cavity to mold it in position on said rigid part, and thereafter ejecting the composite article from said mold cavity.

2. The method of making composite articles including a relatively rigid member and moldable material, which comprises positioning moldable stock having a greater volume than said moldable material adjacent a mold cavity, then forcing the rigid member to which said moldable material is to be applied through said stock to sever therefrom a moldable blank, and shaping said blank between the rigid member and the wall of said cavity to simultaneously mold and apply it to said rigid member.

3. The method of making nails having underheads of thermoplastic material which comprises positioning moldable thermoplastic stock having a greater volume than said underheads adjacent a mold cavity, then forcing the nail shank through said stock and causing the nail head to sever from said stock a moldable blank, and then molding said blank in said mold cavity between the wall of said cavity and said nail to apply it to said nail in operative position.

4. The method of making nails having underheads of thermoplastic material which comprises positioning moldable thermoplastic stock having a greater volume than said underheads adjacent a mold cavity, then forcing the nail through said stock and into said mold cavity whereby the nail head severs from said stock a moldable blank, then molding said blank in said mold cavity between the wall of said cavity and said nail to apply it to said nail in operative position, and then treating the composite article to render said material substantially non-plastic under working conditions.

5. The method of making nails having rubber underheads which comprises positioning unvulcanizable elastomer stock having a greater volume than said rubber underheads adjacent a mold cavity, then driving the nail through said stock and into said mold cavity whereby the nail head severs from the stock a moldable blank and forces said blank into said mold cavity to shape it between the nail and the wall of said cavity and apply it to said nail in operative position, and then treating the composite article to vulcanize the elastomer in position on the nail.

6. The method of making nails having underheads of thermoplastic material which comprises producing a continuous ribbon of moldable thermoplastic material, positioning said ribbon over the path of a continuous series of cavity molds, forcing nail shanks one at a time through said ribbon and causing the nail head to sever from said stock a moldable blank, then molding said blank in said mold between the walls of the cavity and the nail to apply it to the nail in operative position and intermittently advancing said molds as one after another of the nails are driven through the stock and into the molds.

7. The method of making nails having underheads of thermoplastic material which comprises producing a continuous ribbon of moldable thermoplastic material, positioning said ribbon over the path of a continuous series of cavity molds, forcing nail shanks one at a time through said ribbon and causing the nail head to sever from said stock a moldable blank, then molding said blank in said mold between the walls of the cavity and the nail to apply it to the nail in operative position, intermittently advancing said molds one after another of the nails are driven through the stock and into the molds, and ejecting the nails having the molded underheads thereon from the molds one after another.

8. A machine for making a composite article having a part formed of moldable material comprising in combination, a molding die, means for positioning moldable stock having a greater volume than said part formed of moldable material adjacent said die, and means for driving a fastening element through said stock and into said die, said fastening element cooperating with said molding die to thereby blank out a part of said stock and mold it in place on said fastening element in said molding die.

9. A machine for making a composite article having a part formed of a relatively rigid member and another part formed from moldable material comprising in combination, a plurality of molding dies, means for successively locating said dies at a molding station, means for positioning moldable stock adjacent the die at said station, and mechanism for driving said rigid member through said stock and into the adjacent die to thereby blank out a part of said stock and apply it to said rigid member and mold it in place to form a composite article in said die.

10. A machine for making a composite article having a part formed of a relatively rigid member and another part formed from moldable material comprising in combination, a plurality of molding dies, means for successively locating said dies at a molding station, means for positioning moldable stock adjacent the die at said station, mechanism for driving said rigid member through said stock and into the adjacent die and thereby blank out a part of said stock and apply it to said rigid member and mold it in place to form a composite article in said die, and means for ejecting the composite article from the said die.

11. A machine for making a composite article having a part formed of a relatively rigid member and another part formed of moldable material comprising in combination, a plurality of molding dies, means for successively locating said dies at a molding station, means for intermittently feeding a strip of moldable material past said molding station in timed relation to the movement of said dies, and mechanism for driving said rigid member through said strip and into the adjacent die to thereby blank out a part of said strip and apply it to said rigid member and mold it in place to form said composite article in said die.

12. A machine for making a fastener having a part formed of a relatively rigid member and another part formed of moldable material comprising in combination, a rotary drum having a series of molding dies on the periphery thereof, means for intermittently rotating said drum to successively locate said dies at a molding station, means for intermittently feeding a strip of moldable material past said molding station in timed relation to the movement of said drum, and mechanism for driving the rigid member of said fastener through said strip and into the adjacent die to thereby blank out a part of said strip and mold it in place on the rigid member of said fastener in said die.

13. A machine for making a headed fastener having an underhead formed of moldable material comprising in combination, a molding die, means for positioning moldable stock having a greater volume than said underhead adjacent said die, means for positioning a headed fastener adjacent said stock, and means for driving said fastener through said stock and into said die whereby the head of said fastener cooperates with said molding die and blanks out a part of said stock and molds it in place on said fastener in said die to form an underhead.

14. A machine for making a headed fastener having an underhead formed of moldable material comprising in combination, a molding die, means for positioning moldable stock having a greater volume than said underhead adjacent said die, means for positioning a headed fastener adjacent said stock and means for driving said fastener through said stock and into said die whereby the head of said fastener cooperates with said molding die and blanks out a part of said stock and molds it in place on said fastener in said die to form an underhead, and means for ejecting said fastener from said die.

15. A machine for making a headed fastener having an underhead formed of moldable material comprising in combination, a rotary drum having a series of molding dies on the periphery thereof, means for intermittently rotating said drum to successively locate said dies at a molding station, means for intermittently feeding a strip of moldable material past said molding station in timed relation to the movement of said drum, means for successively locating headed fasteners adjacent said strip, and a reciprocating plunger for driving a fastener through said strip and into said die whereby the head of said fastener blanks out a part of said strip and molds it in place in said die to form an underhead on said fastener.

16. A machine for making a headed fastener having an underhead formed of moldable material comprising in combination, a rotary drum having a series of molding dies on the periphery thereof, means for intermittently rotating said drum to successively locate said dies at a molding station including a pawl and ratchet mechanism, means for intermittently feeding a strip of moldable material past said molding station including strip-feeding rollers, a clutch for intermittently operating said rollers in timed relation to the operation of said drum, means for positioning a headed fastener adjacent said strip at said molding station, a reciprocating plunger for driving said fastener through said strip and into the adjacent die to thereby blank out a part of said strip and mold it in place to form an underhead on said fastener in said die, and means for operating said pawl and ratchet to rotate said drum and simultaneously engage said clutch to operate said rollers.

17. A machine for making a headed fastener having an underhead formed of moldable material comprising in combination, a rotary drum having a series of molding dies on the periphery thereof, means for intermittently rotating said drum to successively locate said dies at a molding station including a pawl and ratchet mechanism having a pawl operating lever, means for intermittently feeding a strip of moldable material past said molding station including strip feeding rollers, a clutch and clutch-operating yoke operating said rollers in timed relation to the operation of said drum, means on said pawl operating lever for actuating said clutch yoke, means for positioning a headed fastener adjacent said strip at said molding station, a reciprocating plunger for driving said fastener through said strip and into the adjacent die to thereby blank out a part of said strip to mold it in place to form an underhead on said fastener in said die, and means for actuating said pawl operating lever to rotate said drum and simultaneously engage said clutch to operate said feed rollers during upward movement of said plunger.

18. A machine for making a composite article having a part formed of a relatively rigid member and another part formed of moldable material comprising in combination, a plurality of molding dies, means for successively locating said dies at a molding station, a plasticizing mill for moldable material, means for continuously withdrawing a strip of moldable material from said mill, including a pair of continuously operating strip-feeding rollers, means for intermittently feeding said strip of moldable material past said molding station in timed relation to the movement of said dies including a second pair of rollers, means for intermittently operating said second pair of rollers in timed relation to the movement of said dies, and means for driving the rigid member of the composite article through said strip and into the adjacent die to thereby blank out a part of said strip and mold it in place on the other part of said article in said die.

ARTHUR A. JOHNSON.

References Cited in the file of this patent

UNITED STATES PATENTS

| Number | Name | Date |
|--------|------|------|
| 492,206 | Hunter | Feb. 21, 1893 |
| 557,526 | Egge | Mar. 31, 1896 |
| 624,404 | Thierry | May 2, 1899 |
| 1,172,919 | Weber | Feb. 22, 1916 |
| 1,518,521 | Kraft | Dec. 9, 1924 |
| 1,734,727 | Herold | Nov. 5, 1929 |